United States Patent [19]
Demaine et al.

[11] 4,060,307
[45] Nov. 29, 1977

[54] FACE PLATE GRATICULE

[75] Inventors: David George Anthony Demaine; David Gordon Norrie, both of Leeds, England

[73] Assignee: The Rank Organisation Limited, London, England

[21] Appl. No.: 682,131

[22] Filed: Apr. 30, 1976

[30] Foreign Application Priority Data

Apr. 30, 1975 United Kingdom ............... 17972/75

[51] Int. Cl.² ........................... G02B 5/16; G08B 5/00; G02B 23/10
[52] U.S. Cl. ............................. 350/96 B; 340/366 F; 340/378 B; 356/251
[58] Field of Search .................. 350/96 B, 96 BC; 340/366 F, 366 B, 378 B; 356/251; 240/1 EL, 1 LP

[56] References Cited
U.S. PATENT DOCUMENTS

| | | | |
|---|---|---|---|
| 2,395,605 | 2/1946 | Young | 356/251 |
| 3,502,416 | 3/1970 | Rickert | 356/251 |
| 3,524,702 | 8/1970 | Bellows et al. | 350/96 B |
| 3,962,702 | 6/1976 | Kriege | 350/96 B |

*Primary Examiner*—John K. Corbin
*Assistant Examiner*—Stewart Levy
*Attorney, Agent, or Firm*—Brisebois & Kruger

[57] ABSTRACT

In an optical display system, information recorded on a face plate or like optical element is injected into a main optical path by means of a standby sight device comprising a lens unit and a flexible fibre optic bundle having a numerical aperture sufficiently large to cover the maximum acceptance angle of the lens unit.

6 Claims, 1 Drawing Figure

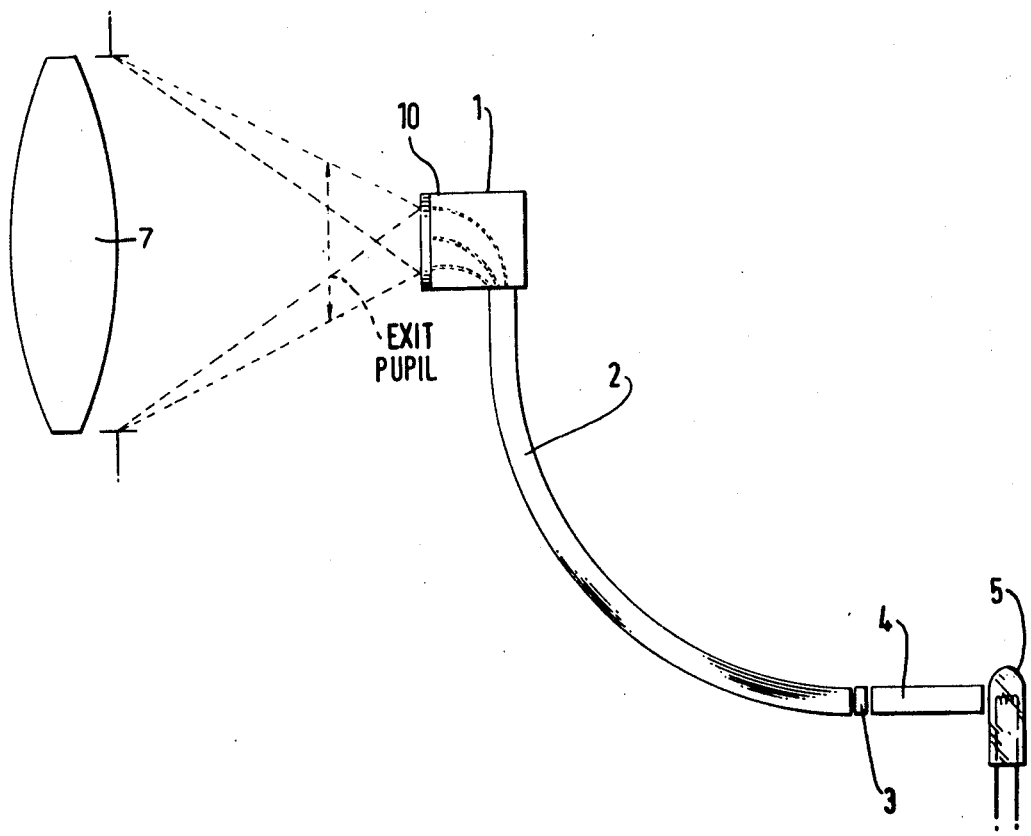

FACE PLATE GRATICULE

This invention relates to an optical system incorporating a stand-by sight device.

Certain optical systems, and in particular certain head-up displays incorporate a stand-by sight device which comprises a graticule which is usable both to align the electronic display and as a stand-by if the electronic display should fail. The graticule usually comprises a set of discretely illuminated lines, whose width subtends at an angle of 0.8 of a milliradian at the eye. Typically, if the graticule is projected into the display using a lens unit having an equivalent focal length of 5 inches, the graticule line width should be 0.004 of an inch.

However, in order that the display is seen over at least a large proportion of the "exit pupil" of the lens unit, which corresponds to the "exit pupil" of the stand-by sight device, it is necessary that the rays are transmitted through the graticule from the illuminating means over an angular field which is at least large enough to fill the cone angle at the focus of the lens unit. This has been made possible by use of fibre optic illuminating means. The use of fibre optic illuminating means has also proved advantageous to facilitate replacement of the lamp source without disturbing the display, to permit the required movement of the graticule in the display, to enable only the used parts of the graticule to be illuminated, whereby to achieve a bright display with a practicable lamp source, and to achieve space saving in restricted conditions.

Hitherto the fibre optic illuminating means has taken one of several forms. In one instance the output ends of the fibres terminate in the graticule plane and are positioned themselves to define the graticule. This arrangement, although requiring a minimum number of fibres, gives rise to dark spots due to the effectively unavoidable existence of dead fibres. In another instance a conventional chrome on glass graticule is cemented to the face of a fibre distributing element, providing illuminated areas behind the graticule markings. The graticule markings may be provided on either that face of the glass adjacent the fibre distributing element or that face remote therefrom. Both arrangements require a low reflective graticule ground with a non-transmitting area to prevent the sun from washing out the display; this cannot easily be provided in the former arrangement. The latter arrangement requires use of either a very thin delicate graticule, which is disadvantageously fragile, or a large diameter fibre bundle which reduces graticule mobility.

According to the present invention there is povided an optical system incorporating a stand-by sight device, wherein the stand-by sight device comprises a flexible fibre optic bundle, a light input unit at one end of the bundle, a fibre distributing element at the other end of the bundle, said element having a face plate coplanar with the output ends of the fibres and on which is deposited a dark ground graticule, and a lens unit through which an image of the graticule is projected via a combining mirror into the user's field of view, the face plate bearing the graticule and the flexible fibre optic bundle having a numerical aperture sufficiently large to cover the maximum acceptance angle of said lens unit.

This arrangement is advantageous in satisfying all major requirements. Firstly only a small fibre optic bundle is required; secondly bright illumination is achieved at the graticule over the required angular field; thirdly there is low reflectivity at the graticule to light (e.g. from the sun) passing through the lens unit from outside the system; and fourthly the lamp is easily accessible for replacement. The arrangement has the added advantage of "integrating" the light from the fibre optic bundle, to produce good uniformity of illumination in the pupil of the lens unit.

In a preferred arrangement, the output ends of the fibres in the distributing element are selectively grouped behind the graticule markings.

The fibre distributing element may conveniently comprise an element in which the optical fibres leading from said other end of the bundle are encapsulated to distribute the output ends of the fibres over the area of the face plate bearing the graticule.

The light input unit preferably comprises a lamp, a clad rod integrator and a colour filter. The filter may be located either between one end of the clad rod integrator and the lamp or the other end of the integrator and the input end of the fibre optic bundle.

The following may be instanced as a practical arrangement of stand-by sight device according to the invention, referring diagrammatically to the accompanying drawing which shows the stand-by sight device.

A quartz-iodine lamp 5 is located in front of one end of a clad rod integrator 4. The integrator 4 transmits light through a colour filter 3 to the input end of a flexible sheathed fibre optic bundle 2. A length of sheath is stripped from the bundle at the other end thereof, and the stripped fibres are encapsulated in a block 1 which selectively distributes the output ends of the fibres in a planar face plate in the form of a slotted metal mask 10 on the block. The ends of the fibres are effectively cemented in the slots in the mask and are ground and polished level with the face of the mask. A dark ground black chrome graticule is deposited directly on the face plate, and the output ends of the fibres are distributed to illuminate the graticule markings.

It is to be appreciated that, by comparison with a conventional chrome or glass graticule which has a reflectivity of approximately 80%, a black chrome graticule has a reflectivity of about 8% only. Black chrome is produced by oxidation of the conventional chrome deposition.

The face plate bearing the graticule, and likewise the flexible fibre optic bundle, have numerical apertures sufficiently large to cover the maximum acceptance angle of a lens unit 7 through which an image of the graticule is projected. This maximum acceptance angle corresponds to the "exit pupil" of the stand-by sight device. With the arrangement according to the invention, this numerical aperture can be achieved using a fibre optic bundle of a size to provide good flexibility of the bundle facilitating mobility of the graticule and enabling illumination to be effected from a simple compact light source.

In practice, the effect of depositing the black chrome graticule directly on the face plate is to bring the plane of the fibre ends substantially into coincidence with the plane of the graticule markings, so that the fibres are required to cover an area only very slightly larger than the area of the markings. In contrast, a conventional graticule say 0.03 of an inch thick which has required three times as many fibres to provide for proper illumination of the graticule markings, thus making it difficult to provide good flexibility of the fibre optic bundle.

We claim:

1. In an optical system having a stand-by sight device comprising a flexible fibre optic bundle, a light input unit at one end of the bundle, a fibre distributing element at the other end of the bundle, and a graticule on the output face of the distributing element, and a lens unit through which an image of the graticule is projected via a combining mirror into the user's field of view, the improvement that the distributing element has a face plate having an outer face with which the output ends of the fibres are coplanar and on which is deposited a dark ground graticule, the face plate bearing the graticule and the flexible fibre optic bundle having a numerical aperture sufficiently large to cover the maximum acceptance angle of the lens unit.

2. An optical system according to claim 1, wherein the output ends of the fibres in the distributing element are selectively grouped behind the graticule markings.

3. An optical system according to claim 1, wherein the fibre distributing element comprises an element in which the optical fibres leading from the other end of the bundle are encapsulated to distribute the output ends of the fibres over the area of the face plate bearing the graticule.

4. An optical system according to claim 1, wherein the light input unit comprises a lamp, and a clad rod integrator and a colour filter interposed between the lamp and the input end of the fibre optic bundle.

5. An optical system according to claim 1, wherein the face plate on the distributing element comprises a slotted mask, the output ends of the fibres terminating in the slots flush with the face of the mask and the dark ground graticule being deposited directly on said mask face.

6. In a head-up display having a stand-by sight device comprising a flexible fibre optic bundle, a light input unit at one end of the bundle, a fibre distributing element at the other end of the bundle, and a graticule on the output face of the distributing element, and a lens unit through which an image of the graticule is projected into the pilot's field of view, the improvement that the distributing element has a face plate in the form of a slotted mask, the output ends of the fibres terminating in the slots and the outer face of the mask, and a dark ground graticule being directly deposited on said mask face.

* * * * *